C. W. LOCKWOOD.
FLUID CHECK VALVE.
APPLICATION FILED FEB. 1, 1909.
932,149.
Patented Aug. 24, 1909.
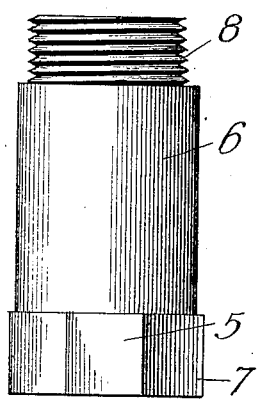
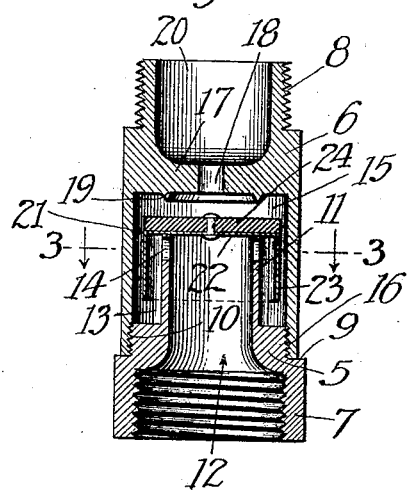
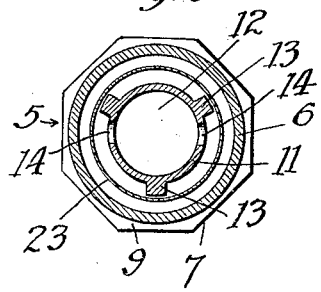
Witnesses
H. R. L. White
R. G. White
Inventor
Charles W. Lockwood.
By Forée Bain and May
Attys.

UNITED STATES PATENT OFFICE.

CHARLES W. LOCKWOOD, OF LA GRANGE, ILLINOIS.

FLUID CHECK-VALVE.

932,149.  Specification of Letters Patent.  Patented Aug. 24, 1909.

Application filed February 1, 1909.  Serial No. 475,358.

*To all whom it may concern:*

Be it known that I, CHARLES W. LOCKWOOD, a citizen of the United States, residing at La Grange, in the county of Cook and State of Illinois, have invented certain new and useful Improvements in Fluid Check-Valves, of which the following is a specification.

My invention relates to improvements in fluid check valves, and has for its general object to provide a check valve structure for connection in a high pressure gas distributing system to stop the flow of gas should the delivery of gas thereto be dangerously increased above normal by the breaking or failure of the pressure governor or regulator controlling the delivery of gas from the high pressure mains to the low pressure house service system.

In a high pressure gas distribution system it is customary to provide a governor to reduce the pressure say from 30 pounds in the mains to, say, 1½ to 2 oz., in the house piping. In the event of rupture of the regulator diaphragm or failure of its valve to seat, however, the gas will be delivered to the house piping at a pressure and in a volume far in excess of any volume which might be utilized in the normal workings of the house system, so blowing the safety seal and causing a great waste of gas. It is to provide automatic means for stopping such an abnormal flow of gas through the piping that my invention is primarily designed.

In the drawing, wherein I have illustrated an embodiment of my invention, Figure 1 is a side elevation thereof; Fig. 2 is a central vertical section; Fig. 3 is a transverse section on line 3—3 of Fig. 2.

In the preferred embodiment of my invention shown, I provide the valve in a structure constituting a pipe coupling and consisting of a base member 5 and a body member 6, the base member 5 being provided with a bottom part in the form of a nut 7, and the body member 6 being provided with an exterior screw thread 8 adjacent its upper end. The nut part 7 of the base member 5 terminates exteriorly at a shoulder 9, and above the shoulder said member is provided with an exterior screw thread 10, above which said member further provides a barrel 11, through which extends the axial passage 12. The barrel 11 is preferably provided exteriorly with guiding ribs 13, and adjacent its upper end has side openings 14 of suitable capacity. The body member 6 is provided with a lower chamber 15 the mouth of which is interiorly screw threaded as at 16 adjacent its lower end for engagement with the threads 10 of the base, and the chamber 15 is partially closed at its upper end by a bridge or partition 17 having therethrough an opening 18 preferably axially disposed, and of capacity in excess of the combined capacities of the apertures 14, heretofore described. Said aperture or passage 18 is preferably surrounded by an annular, projecting sharp-edged valve seat 19, and above the bridge the opening 18 communicates with the passage 20 of suitable size extending to the top of the body within the threaded portion 8 thereof.

Within the chamber 15 is provided the valve structure 21, comprising in the embodiment shown, an inverted metallic cup, whereof the part 22 constitutes a head or transverse disk normally covering the mouth of passage 12, and a rim 23 surrounding the guides 13, for coöperation with said guides 13 to direct the movements of the valve structure in a vertical direction only. Upon the top of the disk or head 22 is secured a suitable soft valve facing, such as a leather disk 24, adapted when pressed against the valve seat 19, to effectually seal the opening 18. In the normal relation of the parts, when the valve structure rests upon the top edge of the barrel 11, the facing 24 is removed from contact with the valve seat 19, and the rim 23 is positioned by the guides 13 intermediate the body of the barrel 11 and the outer wall of chamber 15.

In operation, the coupling is connected in the piping adjacent its point of entry into the building or apartment, preferably in the upright position shown in Fig. 2, as thereby the use of a valve spring is dispensed with. Gas flowing in through the passage 12, passes through the orifices 14 down within the rim 23 of the valve, up around the outside of the valve and out through the passages 18 and 20 to the house piping. The orifices or passageways thus provided are ample in capacity for any normal demands of the installation, so that in the ordinary operation of the gas system within the building the valve remains practically inert. Should, however, the pressure regulator break or fail the abnormal rush of gas permitted by the failure of the regulator, acts with such force upon the cup-shaped or petticoated valve as to raise it bodily and force its leather face into contact with the sharp seat 19, thereby completely closing the outlet 18. The unbalanced pressure of the gas within the chamber 15 of course tends constantly to maintain the valve in closed position until it is intentionally opened. This may readily be done by temporarily cutting off the pressure from the mains and then sufficiently dismantling the valve to free the gas trapped in the structure.

Having described my invention, what I claim is.

1. In a device of the character described, a base structure providing a passageway open at its end, and a lateral passageway, a body part providing a chamber into which said lateral passageways open, a valve port above the valve, and a valve carrying a disk of packing material, normally covering the end opening of the passageway through the base, and having a rim surrounding, but spaced apart from the lateral passages, guidedly movable on the guides 13 to close the valve port.

2. In a device of the character described, a base member providing a central barrel extension, open at its end, and provided with predetermined openings in its side, a body member providing a chamber spaced apart throughout from said barrel and secured to the base, said body portion having a valve port or passage in alinement with the end opening of the barrel, a valve seat surrounding said port and a cup-shaped valve member for closing said port when raised, overlying the mouth of said barrel and having a side rim spaced apart from the side openings in the barrel, said valve structure being arranged when raised by abnormal flow of fluid to close and hold completely closed the valve port in the body.

3. In a device of the character described, a two-piece coupling structure comprising a base and body detachably connected, the body having a bridge therein provided with a port surrounded by a valve seat, and below said bridge providing a chamber, a barrel on the base member, providing a passage alining with said port in the bridge, open at its end, and having side openings to the chamber of the body, and a valve structure providing a plate normally resting on the open end of the barrel, a facing upon the upper side of said plate, and a rim surrounding and guidedly spaced apart from the side openings of the barrel.

4. In a device of the character described, the combination of a base member, provided with exterior threads 10, a reduced barrel 11, above said threaded portion having exterior guiding projections 13, said reduced extension or barrel having a passage 12 therethrough provided adjacent its upper end with side apertures 14, of predetermined capacity, a body 6 providing a chamber 15, the wall whereof surrounds and is spaced apart from the barrel 11 and is provided with threads 16 for engagement with the threads 10 of the base, said chamber terminating at its upper end at a bridge 17, provided with a central valve port 18 communicating with a passage 20 through the exteriorly threaded upper end of the body, and a valve structure comprising a plate 22, normally closing the end opening of the barrel and having a downturned rim 23 guided upon the guides 13 of said barrel, and spaced apart from the chamber wall, said plate 22 carrying a body 24 of packing material.

In testimony whereof I hereunto set my hand in the presence of two witnesses.

CHARLES W. LOCKWOOD.

In the presence of—
 Forée Bain,
 Mary F. Allen.